US012564864B2

(12) United States Patent
Liu et al.

(10) Patent No.: US 12,564,864 B2
(45) Date of Patent: Mar. 3, 2026

(54) THREE-DIMENSIONALLY ARRANGED NANOPARTICLE FILM WITH ARRAY STRUCTURE AND PREPARATION METHOD AND USE THEREOF

(71) Applicant: TAIYUAN UNIVERSITY OF TECHNOLOGY, Taiyuan (CN)

(72) Inventors: Shaoding Liu, Taiyuan (CN); Wei Geng, Taiyuan (CN); Peng Yue, Taiyuan (CN); Lanqi Lian, Taiyuan (CN); Ying Yu, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 213 days.

(21) Appl. No.: 18/266,833

(22) PCT Filed: Mar. 3, 2022

(86) PCT No.: PCT/CN2022/078954
§ 371 (c)(1),
(2) Date: Jun. 13, 2023

(87) PCT Pub. No.: WO2022/227852
PCT Pub. Date: Nov. 3, 2022

(65) Prior Publication Data
US 2024/0091810 A1 Mar. 21, 2024

(30) Foreign Application Priority Data
Apr. 28, 2021 (CN) .......................... 202110467324.6

(51) Int. Cl.
| | |
|---|---|
| *B05D 5/06* | (2006.01) |
| *B05D 3/10* | (2006.01) |
| *B05D 3/14* | (2006.01) |
| *B05D 5/08* | (2006.01) |
| *G02B 1/00* | (2006.01) |

(52) U.S. Cl.
CPC ............... *B05D 5/06* (2013.01); *B05D 3/101* (2013.01); *B05D 3/144* (2013.01); *B05D 5/08* (2013.01); *G02B 1/002* (2013.01)

(58) Field of Classification Search
CPC .......... B05D 5/06; B05D 3/101; B05D 3/144; B05D 5/08
See application file for complete search history.

(56) References Cited

U.S. PATENT DOCUMENTS

| | | | |
|---|---|---|---|
| 2002/0151041 A1 | 10/2002 | Kreimer et al. | |
| 2014/0030821 A1* | 1/2014 | Ohtsuka | G01N 21/648 |
| | | | 436/501 |
| 2016/0061735 A1 | 3/2016 | Chen et al. | |

FOREIGN PATENT DOCUMENTS

| | | | |
|---|---|---|---|
| CN | 105016632 A | * | 11/2015 |
| CN | 105153866 A | | 12/2015 |

(Continued)

OTHER PUBLICATIONS

Nanocomposix. Polystyrene Surface. 2025. https://nanocomposix.com/pages/polystyrene-surface (Year: 2025).*

(Continued)

*Primary Examiner* — Dah-Wei D. Yuan
*Assistant Examiner* — Kristen A Dagenais
(74) *Attorney, Agent, or Firm* — Gearhart Law LLC

(57) ABSTRACT

The present disclosure provides a three-dimensionally arranged nanoparticle film and a preparation method and use thereof, and belongs to the technical field of nanophotonics. The preparation method includes the following steps: coating nanoparticles with hydrophobic molecules, and dispersing in an organic solvent to obtain a modified nanoparticle dispersion; conducting a surface treatment on a three-dimensional template to obtain a hydrophilic three-dimensional template; and adding water to a surface of the hydrophilic three-dimensional template to form a water film, (Continued)

adding the modified nanoparticle dispersion dropwise on a surface of the water film to conduct self-assembly, and removing the water film to obtain a three-dimensionally arranged nanoparticle film with an array structure. In the present disclosure, the nanoparticle film prepared by a self-assembly and template-assisted method can generate vertical and parallel multiple-surface lattice resonances, thereby effectively suppressing radiation loss and enhancing an interaction between light and matters at a nanometer scale.

19 Claims, 9 Drawing Sheets

(56) References Cited

FOREIGN PATENT DOCUMENTS

| CN | 106393726 A | 2/2017 |
| CN | 107313046 A | 11/2017 |
| CN | 109239051 A | 1/2019 |
| CN | 109270046 A | * 1/2019 | ........... G01N 21/658 |
| CN | 110685014 A | * 1/2020 | ............. C30B 35/00 |
| CN | 110899720 A | 3/2020 |
| CN | 113189680 A | 7/2021 |

OTHER PUBLICATIONS

Polysciences. Polystyrene (MW ~40,000). 2025. https://polysciences.com/products/polystyrene-mw-800-5000?srsltid=AfmBOorixR-FOx5QWjZvmW0aArA3Xt-d2Xo_VqoSvF_5lkJxHYpDWvpp (Year: 2025).*

First office action received for Chinese Application No. 202110467324.6, mailed on Jul. 8, 2022, 14 pages.

International Search Report and Written Opinion received for International Application No. PCT/CN2022/078954, mailed on Jun. 20, 2022, 11 pages.

* cited by examiner

1 µm    EHT = 10.00 kV    WD = 4.0 mm    Mag = 10.00 K X    Signal A = SE2

THREE-DIMENSIONALLY ARRANGED NANOPARTICLE FILM WITH ARRAY STRUCTURE AND PREPARATION METHOD AND USE THEREOF

CROSS REFERENCE TO RELATED APPLICATION

The present application is a national stage application of International Patent Application No. PCT/CN2022/078954, filed on Mar. 3, 2022, which claims priority to Chinese Patent Application No. CN202110467324.6 filed to the China National Intellectual Property Administration (CNIPA) on Apr. 28, 2021 and entitled "THREE-DIMENSIONALLY ARRANGED NANOPARTICLE FILM WITH ARRAY STRUCTURE AND PREPARATION METHOD AND USE THEREOF", which is incorporated herein by reference in its entirety.

TECHNICAL FIELD

The present disclosure relates to the technical field of nanophotonics, in particular to a three-dimensionally arranged nanoparticle film with an array structure and a preparation method and use thereof.

BACKGROUND

Surface lattice resonance based on nanoparticle arrays can effectively suppress radiative loss at the resonance mode, thereby enhancing a nanoscale light-matter interaction. This technology is widely used in the fields such as enhancement of a nonlinear effect, biosensing, nano-laser, or enhancement of fluorescence. In order to generate surface lattice resonance, a planar two-dimensional nanoparticle array structure is generally adopted, which is mainly prepared by a "top-down" method and a "bottom-up" method. The "top-down" method is to prepare nanostructures by physical etching techniques such as electron beam etching, ion beam etching, and photoetching. This method can obtain precise and controllable nanostructures, but has high cost and complicated manufacturing process, which is not suitable for the preparation of samples larger than square millimeters. In addition, the nanoparticles used are generally prepared based on electron beam evaporation, laser evaporation, and thermal evaporation, and belong to an amorphous system, showing larger non-radiative losses than crystalline materials. The "bottom-up" method is a self-assembly process. In this process, nanoparticles are used as a basic unit, and an interaction between the nanoparticles is controlled directly or indirectly, such that the nanoparticles are spontaneously assembled into an ordered structure. This type of method has high scalability and low cost, and can obtain nanoparticles with a crystalline structure capable of suppressing non-radiative loss. Accordingly, the method has attracted extensive attention from researchers.

Planar and close-packed nanoparticle films have been prepared with the existing "bottom-up" interfacial self-assembly method. However, this system has a period on the same order as a size of the nanoparticles, such that local resonance of the nanoparticles cannot be coupled with Rayleigh anomaly of the array, which is unable to excite the surface lattice resonance. The hole template with a planar period derived from physical etching can form a two-dimensionally arranged nanoparticle array structure through self-assembly. By adjusting the period of the hole template, the local resonance of the nanoparticles can be coupled with the Rayleigh anomaly of the array, thereby exciting the surface lattice resonance. However, in this method, the size of template holes is generally larger than that of the nanoparticles, resulting in a certain uncertainty in positions of the nanoparticles. As a result, it is difficult to form an array structure with a consistent period, thus affecting the improvement of a quality factor of the formed surface lattice resonance.

SUMMARY

In view of this, an objective of the present disclosure is to provide a three-dimensionally arranged nanoparticle film with an array structure and a preparation method and use thereof. In the present disclosure, the film prepared by the preparation method has a three-dimensional array structure, and can excite sharp surface lattice resonances in different polarization directions, thereby effectively enhancing an interaction strength between light and matters at a nanometer scale.

To achieve the above objective, the present disclosure provides the following technical solutions:

The present disclosure provides a preparation method of a three-dimensionally arranged nanoparticle film with an array structure, including the following steps:

(1) coating nanoparticles with hydrophobic molecules, and dispersing in an organic solvent to obtain a modified nanoparticle dispersion;

(2) conducting a surface treatment on a three-dimensional template to obtain a hydrophilic three-dimensional template; and (3) adding water to a surface of the hydrophilic three-dimensional template to form a water film, adding the modified nanoparticle dispersion dropwise on a surface of the water film to conduct self-assembly, and removing the water film to obtain a three-dimensionally arranged nanoparticle film with an array structure that is arranged along the three-dimensional template; where steps (1) and (2) are conducted in any order.

Preferably, the nanoparticle is selected from the group consisting of a metal nanoparticle and a solid dielectric nanoparticle;

the nanoparticle has a particle size of 10 nm to 500 nm; and the nanoparticle is in a shape of includes a sphere, a cube, a disk, a rod, a cone, or an arrowhead.

Preferably, the modified nanoparticle dispersion has a concentration of 5 mg/mL to 300 mg/mL;

the modified nanoparticle dispersion is added dropwise on the surface of the water film at a volume of 0.1 μL to 1,000 μL; and the water film has a thickness of 0.1 mm to 100 mm and a radius of 0.1 cm to 100 cm.

Preferably, the metal nanoparticle is a noble metal nanoparticle.

Preferably, the solid dielectric nanoparticle includes a lithium niobate nanoparticle.

Preferably, the hydrophobic molecule is one or more selected from the group consisting of polystyrene, polyvinylpyrrolidone, polytetrafluoroethylene, polydimethylsiloxane, polyvinylidene fluoride, polypropylene, polyethylene, polymethyl methacrylate, polyolefin, polyamide, polyacrylonitrile, polycarbonate, fluorosilicone resin, molten paraffin, and silicone wax emulsion.

Preferably, the hydrophobic molecule has a number-average molecular weight of 1,000 to 50,000.

Preferably, the hydrophobic molecule and the nanoparticle are at a mass ratio of 1:(1-3).

Preferably, the organic solvent is selected from the group consisting of chloroform, toluene, and tetrahydrofuran.

Preferably, the three-dimensional template is selected from the group consisting of a polydimethylsiloxane wrinkled template, a polystyrene wrinkled template, and a physically etched template; and the three-dimensional template has an array period greater than or equal to the particle size of the nanoparticle.

Preferably, the surface treatment includes one or more of plasma cleaning, piranha solution cleaning, and Radio Corporation of America (RCA) standard cleaning.

Preferably, the surface treatment is to subject a middle region of the three-dimensional template to a hydrophilic treatment, while other regions are not subjected to the surface treatment; and the middle region has an area accounting for 60% to 65% that of the three-dimensional template.

Preferably, a preparation method of the polydimethylsiloxane wrinkled template includes the following steps:

(1) mixing a polydimethylsiloxane (PDMS) prepolymer with a curing agent, and conducting curing to obtain a PDMS sheet;

(2) stretching the PDMS sheet, and conducting cleaning, an oxygen treatment, and release recovery in sequence to obtain orderly-arranged wrinkles; and (3) conducting cleaning, the oxygen treatment, the piranha solution treatment, and water washing on the orderly-arranged wrinkles to obtain the PDMS wrinkled template.

Preferably, in step (1), the PDMS prepolymer and the curing agent are at a mass ratio of (7-15):1.

Preferably, in step (2), the stretching is conducted at a stretching rate of 10% to 35%;

the oxygen treatment is conducted at an oxygen concentration of 0.1 mbar to 0.3 mbar for 10 sec to 30 sec; and the release recovery is conducted at 900 μm/min to 1,100 μm/min.

Preferably, in step (3), the oxygen treatment is conducted at an oxygen concentration of 0.1 mbar to 0.3 mbar for 10 sec to 20 sec.

Preferably, a preparation method of the polystyrene wrinkled template includes the following steps:

conducting an ultrasonic treatment on a polystyrene (PS) nanosphere aqueous suspension, and mixing with ethanol to obtain a PS nanosphere mixture; and placing a substrate in deionized water, injecting the PS nanosphere mixture into a surface of the deionized water, spreading PS nanospheres on an air/water interface to form a PS nanosphere monolayer film, and removing the deionized water by extraction, such that the PS nanosphere monolayer film falls on the substrate to obtain the polystyrene wrinkled template.

Preferably, the PS nanosphere has a particle size of 500 nm to 5 μm;

the ultrasonic treatment is conducted at 50 W to 300 W for 10 min to 15 min; and the injecting is conducted at 0.1 μL/min to 0.5 μL/min.

Preferably, when the PS nanosphere has a particle size of 0.5 μm to 2 μm, the PS nanosphere aqueous suspension and the ethanol are at a volume ratio of 1:(0.6-1); and when the PS nanosphere has a particle size of 2 μm to 5 μm, the PS nanosphere aqueous suspension and the ethanol are at a volume ratio of 1:(0.4-0.6).

Preferably, the self-assembly is conducted for 0.5 sec to 2 sec.

Preferably, the water film has a thickness of 0.1 mm to 100 mm and a radius of 0.1 cm to 100 cm.

Preferably, the water film is removed by suction removal, natural evaporation, or heating evaporation.

Preferably, the heating evaporation is conducted at 30° C. to 40° C.

The present disclosure further provides a three-dimensionally arranged nanoparticle film with an array structure prepared by the preparation method.

Preferably, the array structure has a pore size of 0.1 μm to 10 μm.

The present disclosure further provides use of the three-dimensionally arranged nanoparticle film with an array structure in enhancement of a nonlinear effect, biosensing, nano-laser, or enhancement of fluorescence.

The present disclosure provides a preparation method of a three-dimensionally arranged nanoparticle film with an array structure, including the following steps: (1) coating nanoparticles with hydrophobic molecules, and dispersing in an organic solvent to obtain a modified nanoparticle dispersion; (2) conducting a surface treatment on a three-dimensional template to obtain a hydrophilic three-dimensional template; and (3) adding water to a surface of the hydrophilic three-dimensional template to form a water film, adding the modified nanoparticle dispersion dropwise on a surface of the water film to conduct self-assembly, and removing the water film to obtain a three-dimensionally arranged nanoparticle film with an array structure that is arranged along the three-dimensional template; where steps (1) and (2) are conducted in any order. In the present disclosure, a three-dimensionally arranged nanoparticle film with an array structure is prepared by a method combining self-assembly and template assistance. There is a phase delay in the propagation of a light field, which enables local resonance of the nanoparticles to be coupled with Rayleigh anomaly of the array, generating vertical and parallel multiple-surface lattice resonances without relying on matching refractive index conditions of the substrate. Due to the existence of three-dimensional array structure, an equivalent dipole moment can be formed in the same direction as a wave vector of an incident light field, such that the surface lattice resonance can also be excited in an orthogonal polarization direction. In the case of using a flexible substrate, an array period can be adjusted conveniently by stretching the substrate, and then the peak position and quality factor of the surface lattice resonance can be adjusted. In addition, with nanoparticles as a basic unit, radiation loss of the nanoparticles is effectively suppressed, and an interaction between light and matters is enhanced, which can be applied in enhancement of a nonlinear effect, biosensing, nano-laser, or enhancement of fluorescence. Moreover, the preparation method has excellent versatility, simple operations, and a low cost.

The present disclosure further provides a three-dimensionally arranged nanoparticle film with an array structure prepared by the preparation method. In the present disclosure, the three-dimensionally arranged nanoparticle film can generate surface lattice resonance under excitation of different polarized light, thereby effectively suppressing radiation loss and enhancing an interaction between light and matters at a nanometer scale. The nanoparticle film has desirable application prospects in enhancement of a nonlinear effect, biosensing, nano-laser, or enhancement of fluorescence.

DETAILED DESCRIPTION OF THE EMBODIMENTS

Figure 1:
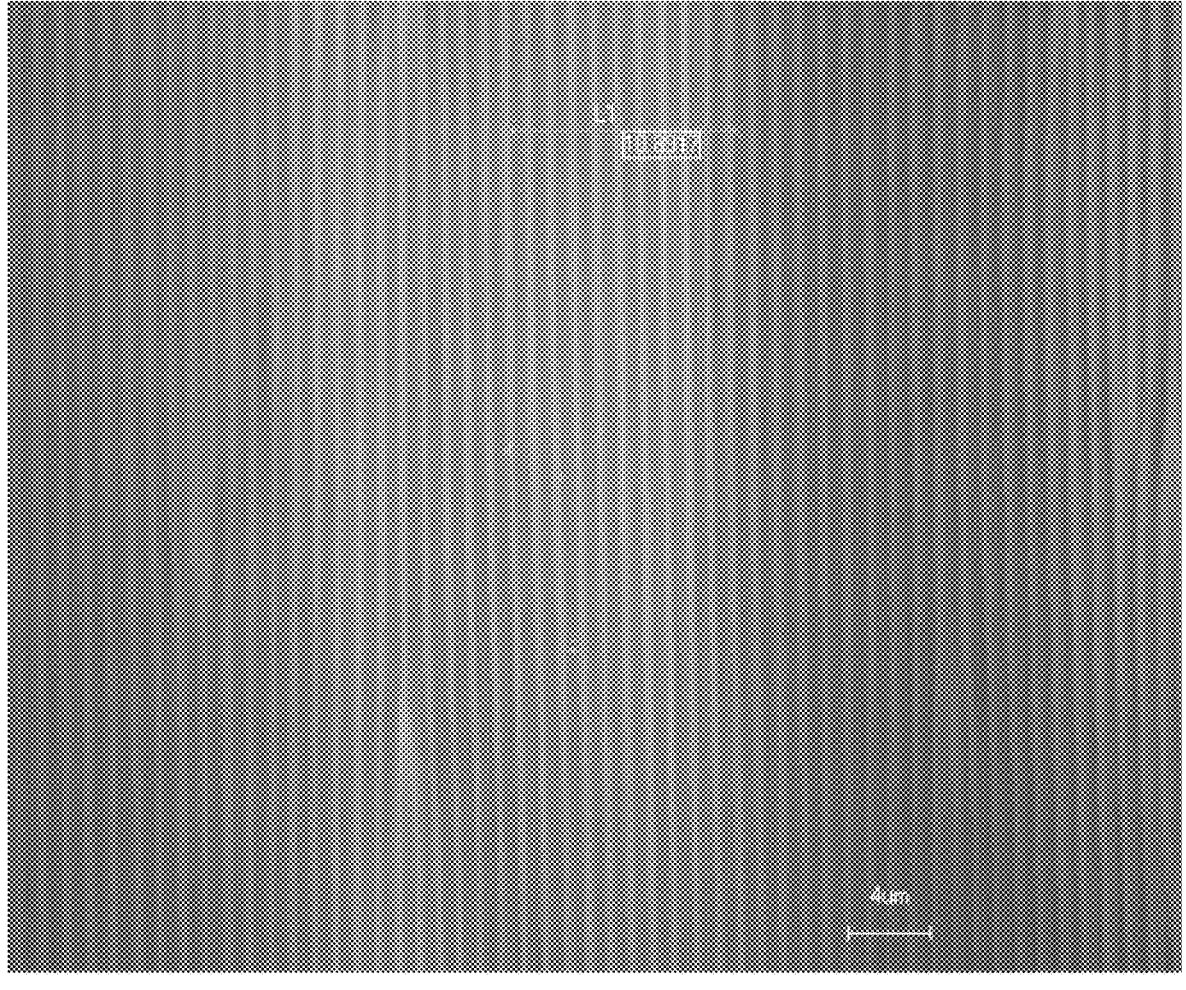
FIG. 1 shows an optical microscope reflection map of a PDMS wrinkled array template prepared in Example 1.

The present disclosure is further described below with reference to the accompanying drawings and examples.

The present disclosure provides a preparation method of a three-dimensionally arranged nanoparticle film with an array structure, including the following steps:

(1) coating nanoparticles with hydrophobic molecules, and dispersing in an organic solvent to obtain a modified nanoparticle dispersion;

(2) conducting a surface treatment on a three-dimensional template to obtain a hydrophilic three-dimensional template; and (3) adding water to a surface of the hydrophilic three-dimensional template to form a water film, adding the modified nanoparticle dispersion dropwise on a surface of the water film to conduct self-assembly, and removing the water film to obtain a three-dimensionally arranged nanoparticle film with an array structure that is arranged along the three-dimensional template;

where steps (1) and (2) are conducted in any order.

In the present disclosure, unless otherwise specified, all raw material components are commercially available products well known to persons skilled in the art.

In the present disclosure, nanoparticles are coated with hydrophobic molecules, and dispersed in an organic solvent to obtain a modified nanoparticle dispersion.

In the present disclosure, the nanoparticle is preferably selected from the group consisting of a metal nanoparticle and a solid dielectric nanoparticle; the metal nanoparticle is preferably a noble metal nanoparticle, and the noble metal nanoparticle includes preferably a gold nanoparticle; the solid dielectric nanoparticle includes preferably a lithium niobate nanoparticle; the nanoparticle has a particle size of preferably 10 nm to 500 nm, more preferably 100 nm to 400 nm, and most preferably 200 nm to 300 nm; and the nanoparticle is in a shape of includes a sphere, a cube, a disk, a rod, a cone, or an arrowhead. The hydrophobic molecule is preferably one or more selected from the group consisting of polystyrene, polyvinylpyrrolidone, polytetrafluoroethylene, polydimethylsiloxane, polyvinylidene fluoride, polypropylene, polyethylene, polymethyl methacrylate, polyolefin, polyamide, polyacrylonitrile, polycarbonate, fluorosilicone resin, molten paraffin, and silicone wax emulsion. The hydrophobic molecule solution is preferably obtained by dissolving hydrophobic molecules in an organic solvent; and the hydrophobic molecule has a number-average molecular weight of preferably 1,000 to 50,000, more preferably 10,000 to 40,000, most preferably 20,000 to 30,000. The hydrophobic molecule and the nanoparticle are at a mass ratio of preferably 1:(1-3), more preferably 1:(1.5-2.5), and most preferably 1:2.

In the present disclosure, a process of coating nanoparticles with hydrophobic molecules includes preferably the following steps: dissolving the hydrophobic molecules in an amphiphilic solvent to obtain a hydrophobic molecule solution; dispersing the nanoparticles in water to obtain a nanoparticle aqueous dispersion; and mixing the hydrophobic molecule solution with the nanoparticle aqueous dispersion, and conducting coating to obtain the modified nanoparticles. The amphiphilic solvent is preferably selected from the group consisting of chloroform, toluene, and tetrahydrofuran. The hydrophobic molecule solution has a concentration of preferably 0.1 mg/mL to 5 mg/mL, more preferably 0.5 mg/mL to 4 mg/mL, and most preferably 1 mg/mL to 2 mg/mL. The nanoparticle aqueous dispersion has a concentration of preferably 0.1 mg/mL to 1 mg/mL, more preferably 0.4 mg/mL to 0.6 mg/mL, and most preferably 0.5 mg/mL. The mixing is conducted by preferably stirring; there is no special limitation on a speed of the mixing by stirring, as long as the raw materials can be mixed evenly; and the mixing is conducted for preferably 5 min to 30 min, more preferably 10 min to 25 min, and most preferably 15 min to 20 min. The coating is conducted preferably by standing still at preferably a room temperature in preferably a protective atmosphere for preferably 12 h to 48 h, more preferably 18 h to 24 h, and most preferably 24 h; there is no special limitation on the protective atmosphere, and a protective atmosphere well known to those skilled in the art can be used, such as nitrogen, helium, or argon. During the coating, the hydrophobic molecule is combined with the nanoparticle, such that the hydrophobic molecule is coated on a surface of the nanoparticle to form a nanoparticle capped by the hydrophobic molecule.

In the present disclosure, after the coating, a coated product is preferably washed to obtain the modified nanoparticles. A solvent used in the washing is preferably selected form the group consisting of chloroform, toluene, and tetrahydrofuran; the washing is conducted preferably 2 to 3 times, by preferably centrifugal washing at preferably 3,000 r/min to 5,000 r/min, more preferably 4,000 r/min.

In the present disclosure, the organic solvent is preferably selected form the group consisting of chloroform, toluene, and tetrahydrofuran. The modified nanoparticle dispersion has a concentration of preferably 5 mg/mL to 300 mg/mL, more preferably 5 mg/mL to 100 mg/mL, even more preferably 10 mg/mL to 50 mg/mL, and most preferably 15 mg/mL to 30 mg/mL. The modified nanoparticle dispersion with too high or too low concentration cannot form a pore array; by controlling the concentration of the modified nanoparticle dispersion within the above range, a three-dimensionally arranged nanoparticle film with an array structure can be obtained, having a pore size of 0.1 μm to 10 μm.

In the present disclosure, a surface treatment is conducted on a three-dimensional template to obtain a hydrophilic three-dimensional template. The three-dimensional template is preferably selected from the group consisting of a polydimethylsiloxane (PDMS) wrinkled template, a polystyrene (PS) wrinkled template, and a physically etched template. The three-dimensional template has an array period greater than or equal to the particle size of the nanoparticle.

In the present disclosure, the surface treatment is preferably to subject a middle region of the three-dimensional template to a hydrophilic treatment, while other regions are not subjected to the surface treatment; and the middle region has an area accounting for preferably 60% to 65%, more preferably 61% to 64% that of the three-dimensional template. After the hydrophilic treatment of the middle region, the middle region is hydrophilic, while the other regions are hydrophobic, which can ensure that water forms circular water droplets on the surface of the three-dimensional template, thus ensuring the radian of a water surface, such that the self-assembly can proceed smoothly; the hydrophilic treatment can also ensure that the nanoparticles and the substrate are fully adhered. During the hydrophilic treatment, preferably a peripheral area of the three-dimensional template is shielded, and then the three-dimensional template is placed in plasma for the hydrophilic treatment. The shielding is conducted preferably with a paper sheet, and a shape of the paper sheet is preferably circular.

In the present disclosure, the surface treatment (hydrophilic treatment) includes preferably one or more of plasma cleaning, piranha solution cleaning, and RCA standard cleaning; there is no special limitation on the plasma cleaning, the piranha solution cleaning, and the RCA standard cleaning, and operations of the plasma cleaning, piranha solution cleaning, and RCA standard cleaning well known to those skilled in the art can be used.

In the present disclosure, a preparation method of the PDMS wrinkled template includes preferably the following steps:
- (1) mixing a polydimethylsiloxane (PDMS) prepolymer with a curing agent, and conducting curing to obtain a PDMS sheet;
- (2) stretching the PDMS sheet, and conducting cleaning, an oxygen treatment, and release recovery in sequence to obtain orderly-arranged wrinkles; and

- (3) conducting cleaning, the oxygen treatment, the piranha solution treatment, and water washing on the orderly-arranged wrinkles to obtain the PDMS wrinkled template.

In the present disclosure, a PDMS prepolymer is mixed with a curing agent, and curing is conducted to obtain a PDMS sheet. The PDMS prepolymer and the curing agent are at a mass ratio of preferably (7-15):1, more preferably (10-12):1. In an example, the PDMS prepolymer and the curing agent each are preferably Sylgard 184, preferably purchased from Dow Corning. The mixing is conducted by preferably stirring, and there is no special limitation on speed and time of the mixing by stirring, provided that the raw materials can be fully and uniformly mixed. The curing is conducted at preferably 60° C. to 90° C., more preferably 70° C. to 80° C. for preferably 1 h to 5 h, more preferably 2 h to 3 h in preferably a glass fixture template: there is no special limitation on the glass fixture template. After the curing, a cured product is preferably cut to obtain a PDMS sheet. There is no special limitation on a size of the PDMS sheet; in an example, the PDMS sheet has a size of preferably 1 cm×5 cm×2 mm, where 2 mm is a thickness of the PDMS sheet.

In the present disclosure, the PDMS sheet is stretched, and cleaning, an oxygen treatment, and release recovery is conducted in sequence to obtain orderly-arranged wrinkles. The stretching includes preferably: fixing the PDMS sheet in a fixture, and stretching along a transverse axis direction to obtain the PDMS sheet that maintains a fixed stretched state; the stretching is conducted a stretching rate of preferably 10% to 35%, more preferably 20% to 30%; there is no special limitation on the fixture, as long as the PDMS sheet can be fixed. The cleaning is conducted preferably by placing the PDMS sheet that maintains a fixed stretched state in a plasma cleaner, at a power of preferably 10 W to 20 W, more preferably 15 W. The oxygen treatment is conducted at an oxygen concentration of preferably 0.1 mbar to 0.3 mbar, more preferably 0.2 mbar for preferably 10 sec to 30 sec, more preferably 20 sec. The release recovery is conducted at preferably 900 μm/min to 1,100 μm/min, more preferably 1,000 μm/min. During the oxygen treatment, a glass-like substance is formed on a surface of the PDMS sheet; after taking out and conducting release recovery, the PDMS sheet presents a hydrophobic state.

In the present disclosure, cleaning, the oxygen treatment, the piranha solution treatment, and water washing are conducted on the orderly-arranged wrinkles to obtain the PDMS wrinkled template. The cleaning is conducted preferably in a plasma cleaner, at a power of preferably 10 W to 20 W, more preferably 15 W. The oxygen treatment is conducted at an oxygen concentration of preferably 0.1 mbar to 0.3 mbar, more preferably 0.2 mbar for preferably 10 sec to 20 sec, more preferably 15 sec; the oxygen treatment makes the orderly-arranged wrinkles have a surface hydrophilic effect. The piranha solution treatment is preferably to add a piranha solution dropwise on a wrinkled surface; the piranha solution treatment is conducted for preferably 2 min to 5 min, more preferably 3 min to 4 min; and the piranha solution is a mixture of concentrated sulfuric acid and 30% hydrogen peroxide in a volume ratio of 7:3. The water washing is preferably deionized water washing, and there is no special limitation on the number of times of the deionized water washing, as long as the piranha solution can be completely removed.

In the present disclosure, a preparation method of the polystyrene wrinkled template includes preferably the following steps:

conducting an ultrasonic treatment on a polystyrene (PS) nanosphere aqueous suspension, and mixing with ethanol to obtain a PS nanosphere mixture; and placing a substrate in deionized water, injecting the PS nanosphere mixture into a surface of the deionized water, spreading PS nanospheres on an air/water interface to form a PS nanosphere monolayer film, and removing the deionized water by extraction, such that the PS nanosphere monolayer film falls on the substrate to obtain the polystyrene wrinkled template.

In the present disclosure, an ultrasonic treatment is conducted on a PS nanosphere aqueous suspension, and the suspension is mixed with ethanol to obtain a PS nanosphere mixture. The PS nanosphere has a particle size of preferably 500 nm to 5 μm, more preferably 1 μm to 4 μm, and even more preferably 2 μm to 3 μm; the PS nanospheres with the above particle size can form a corresponding structure to be used as a three-dimensional template. The ultrasonic treatment is conducted at preferably 50 W to 300 W, more preferably 100 W to 150 W for preferably 10 min to 15 min, more preferably 12 min to 13 min. The PS nanosphere aqueous suspension and the ethanol are at a volume ratio preferably determined according to a size of the PS nanosphere. Specifically, when the PS nanosphere has a particle size of 0.5 μm to 2 μm, the PS nanosphere aqueous suspension and the ethanol are at a volume ratio of preferably 1:(0.6-1); when the PS nanosphere has a particle size of 2 μm to 5 μm, the PS nanosphere aqueous suspension and the ethanol are at a volume ratio of preferably 1:(0.4-0.6).

In the present disclosure, a substrate is placed in water, the PS nanosphere mixture is injected into a surface of the water, PS nanospheres are spread on an air/water interface to form a PS nanosphere monolayer film, and the water is removed by extraction, such that the PS nanosphere monolayer film falls on the substrate to obtain the polystyrene wrinkled template. The substrate is preferably placed in a petri dish filled with deionized water; and the substrate includes preferably a silicon wafer and a glass wafer. The injecting is conducted preferably with a syringe pump at preferably 0.1 μL/min to 0.5 μL/min, more preferably 0.2 μL/min to 0.3 μL/min. The water is preferably deionized water. The water is removed by preferably extraction using a syringe pump.

In the present disclosure, there is no special limitation on a preparation method of the physically etched template, and preparation methods of the physically etched template well known to those skilled in the art can be used.

In the present disclosure, water is added to a surface of the hydrophilic three-dimensional template to form a water film, the modified nanoparticle dispersion is added dropwise on a surface of the water film to conduct self-assembly, and the water film is removed to obtain a three-dimensionally arranged nanoparticle film with an array structure that is arranged along the three-dimensional template.

In the present disclosure, the water film has a thickness of preferably 0.1 mm to 100 mm, more preferably 1 mm to 80 mm, and most preferably 20 mm to 50 mm, and a radius of preferably 0.1 cm to 100 cm, more preferably 1 cm to 80 cm, and most preferably 20 cm to 50 cm.

In the present disclosure, the self-assembly is conducted preferably at a room temperature for preferably 0.5 sec to 2 sec, more preferably 1 sec to 1.5 sec. The self-assembly results in a nanoparticle film packed closely along a surface of the water film.

In the present disclosure, the water film is removed by suction removal, natural evaporation, or heating evaporation. The suction removal is preferably to extract water using a syringe pump. The natural evaporation is preferably static evaporation at a room temperature, and there is no special limitation on a time of the static evaporation, as long as the water film can be removed. The heating evaporation is conducted at preferably 30° C. to 40° C., more preferably 33° C. to 35° C.; there is no special limitation on a time of the heating evaporation, as long as the water film can be removed. When the water film is removed, a surface tension can guide the nanoparticle film to arrange along the three-dimensional template, forming a three-dimensionally arranged nanoparticle film with an array structure.

In the present disclosure, a three-dimensionally arranged nanoparticle film is prepared by a method combining self-assembly and template assistance. Due to the coupling between the local resonances of the closely packed nanoparticles and the Rayleigh anomaly of the array, sharp multiple-surface lattice resonances can be excited independently of matching refractive index conditions with the substrate. In addition, using nanoparticles as a basic unit can effectively suppress the radiation loss of materials and enhance an interaction between light and matters, which can be used in enhancement of a nonlinear effect, biosensing, nano-laser, or enhancement of fluorescence. Compared with other existing self-assembly methods, the preparation method realizes the preparation of a complex three-dimensional nanoparticle film with an array structure, stimulates multiple-surface lattice resonances, and does not rely on refractive index matching of the substrate. Compared with sputtering coating, the preparation method uses nanoparticles synthesized by a chemical solution method as a basic unit, which effectively suppresses the radiation loss of the material itself; moreover, the three-dimensional structure of noble metal nanoparticles has more excellent optical effects, such as vertical and parallel multiple-surface lattice resonance and non-matching refractive index. Compared with the three-dimensional structure of noble metal nanoparticles prepared by photoetching, the method has low cost and various and adjustable structures; compared with a method for sputtering a noble metal film plated on the surface of the substrate, the method has less system loss. In addition, the preparation method has low cost, desirable versatility, and simple operations.

The present disclosure further provides a three-dimensionally arranged nanoparticle film with an array structure prepared by the preparation method. In the three-dimensionally arranged nanoparticle film with an array structure, the array structure has a pore size of preferably 0.1 μm to 10 μm.

The present disclosure further provides use of the three-dimensionally arranged nanoparticle film with an array structure in enhancement of a nonlinear effect, biosensing, nano-laser, or enhancement of fluorescence. In the present disclosure, the three-dimensionally arranged nanoparticle film with an array structure can stimulate surface lattice resonance effects in multiple directions, does not depend on refractive index matching with the substrate, and has low non-radiative loss. The three-dimensionally arranged nanoparticle film with an array structure prepared by chiral nanoparticles also has a chiral response, showing a desirable application prospect in enhancement of a nonlinear effect, biosensing, nano-laser, or enhancement of fluorescence.

The technical solutions of the present disclosure will be clearly and completely described below with reference to the examples of the present disclosure. Apparently, the described examples are only a part of, not all of, the examples of the present disclosure. All other examples obtained by a person of ordinary skill in the art based on the examples of the present disclosure without creative efforts shall fall within the protection scope of the present disclosure.

Example 1

(1) gold nanoparticles with a diameter of 35 nm were placed in water to obtain a gold nanosphere particle dispersion with a concentration of 0.5 mg/mL; under a nitrogen atmosphere, 4 mg of thiolated polystyrene was added into 4 mL of tetrahydrofuran under stirring to obtain a thiolated polystyrene solution; under a room temperature at 500 r/min, 100 μL of the gold nanosphere particle dispersion was added dropwise to the thiolated polystyrene solution, and allowed to stand for 12 h; and an obtained solid product was subjected to centrifuged washing 2 times with chloroform at 4,000 r/min to obtain modified nanoparticles;

(2) the coated nanoparticles were dispersed in chloroform to obtain a modified nanoparticle dispersion with a concentration of 30 mg/mL;

(3) a PDMS prepolymer and a curing agent were mixed according to a mass ratio of 10:1, stirred well and poured into a glass fixture template, and then cured in an oven at 80° C. for 5 h; an obtained large PDMS sheet of 10 cm×10 cm×2 mm was cut into 1 cm×5 cm×2 mm to obtain a PDMS sheet;

the PDMS sheet was fixed in a fixture, stretched along a transverse direction to a stretching rate of 15%, a PDMS sheet maintaining in a fixed stretched state was placed in a plasma cleaner and treated (cleaned) with oxygen at a concentration of 0.2 mbar for 30 sec at 10 W, and subjected to release recovery at an average speed of 1,000 μm/min to obtain a PDMS sheet with orderly-arranged wrinkles;

the PDMS sheet with orderly-arranged wrinkles was cleaned in a plasma cleaner at 10 W, and treated (cleaned) with oxygen at a concentration of 0.2 mbar for 20 sec to achieve a hydrophilic effect on the surface; 20 μL of a piranha solution was added dropwise to treat a wrinkled surface of the PDMS sheet with orderly-arranged wrinkles for 5 min, and washed with deionized water to obtain a PDMS wrinkled array template; and (4) 750 μL of deionized water was added dropwise onto the PDMS wrinkled array template to form a circular water droplet with a radius of 1 cm, 2 μL of the modified nanoparticle dispersion was added dropwise to a middle position of the circular water droplet at 30° C. with a micropipette, and allowed to stand for evaporation after self-assembly for 1 sec, such that a monolayer film fell on the PDMS wrinkled array template and was completely attached to the template, so as to obtain a three-dimensionally arranged nanoparticle film with an array structure (having a period of 750 nm, a diameter of gold nanospheres of 35 nm, an interval of gold nanospheres of 5 nm, and a wrinkle height of 126 nm).

FIG. 1 showed an optical microscope reflection map of the PDMS wrinkled array template prepared in this example; it was seen from FIG. 1 that a neatly-structured PDMS wrinkled array template was prepared in the present disclosure.

Figure 2:
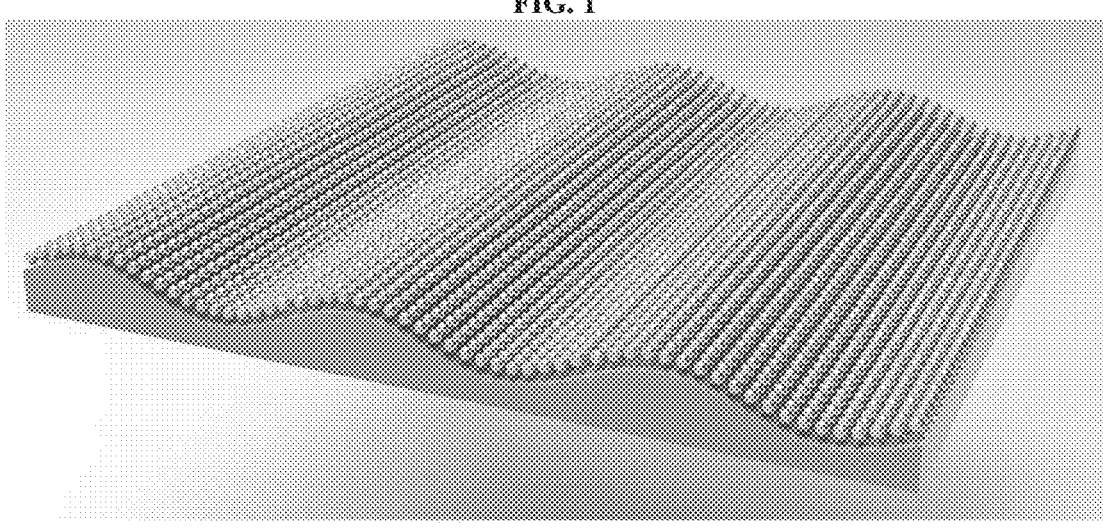
FIG. 2 shows a schematic diagram of a three-dimensionally arranged nanoparticle film with an array structure prepared in Example 1.
Figure 3:
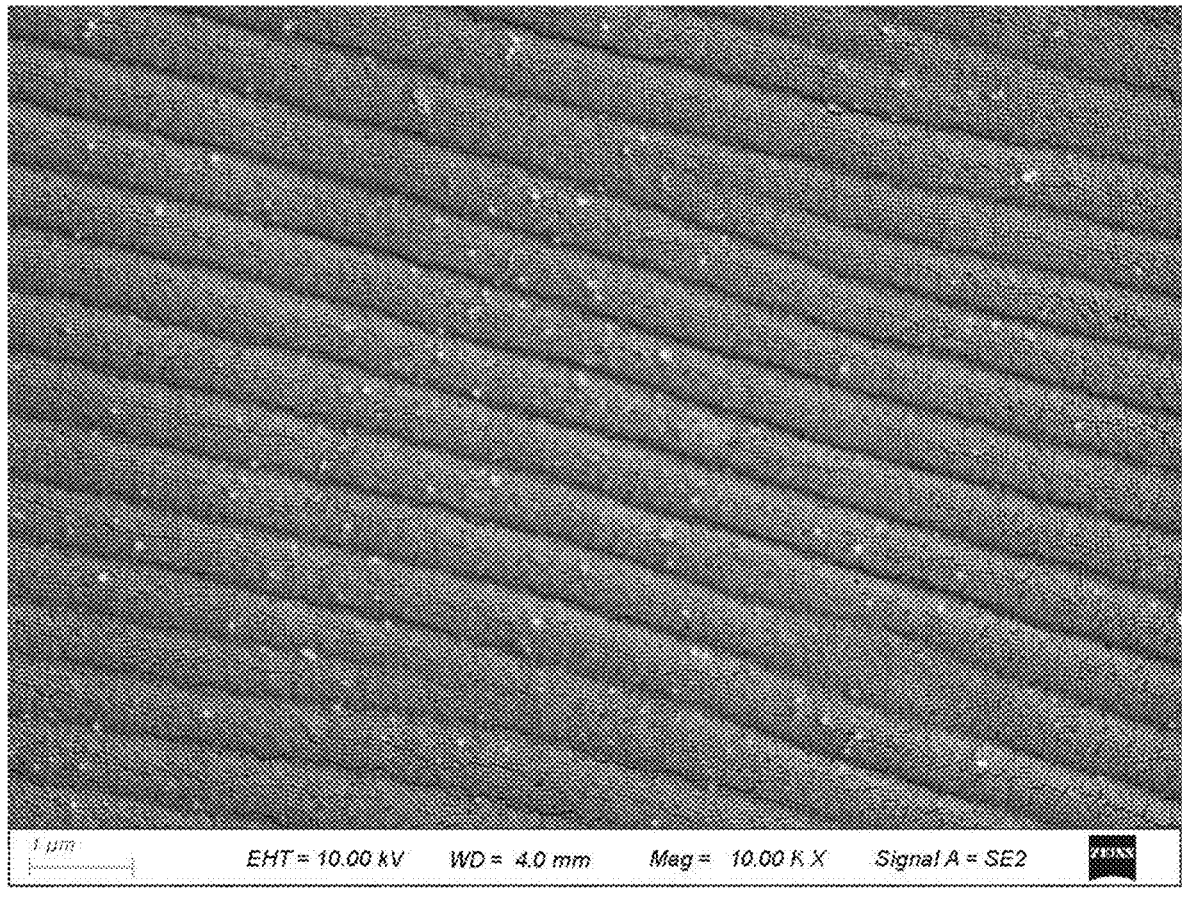
FIG. 3 shows a real picture of the three-dimensionally arranged nanoparticle film with an array structure prepared in Example 1.
Figure 4:
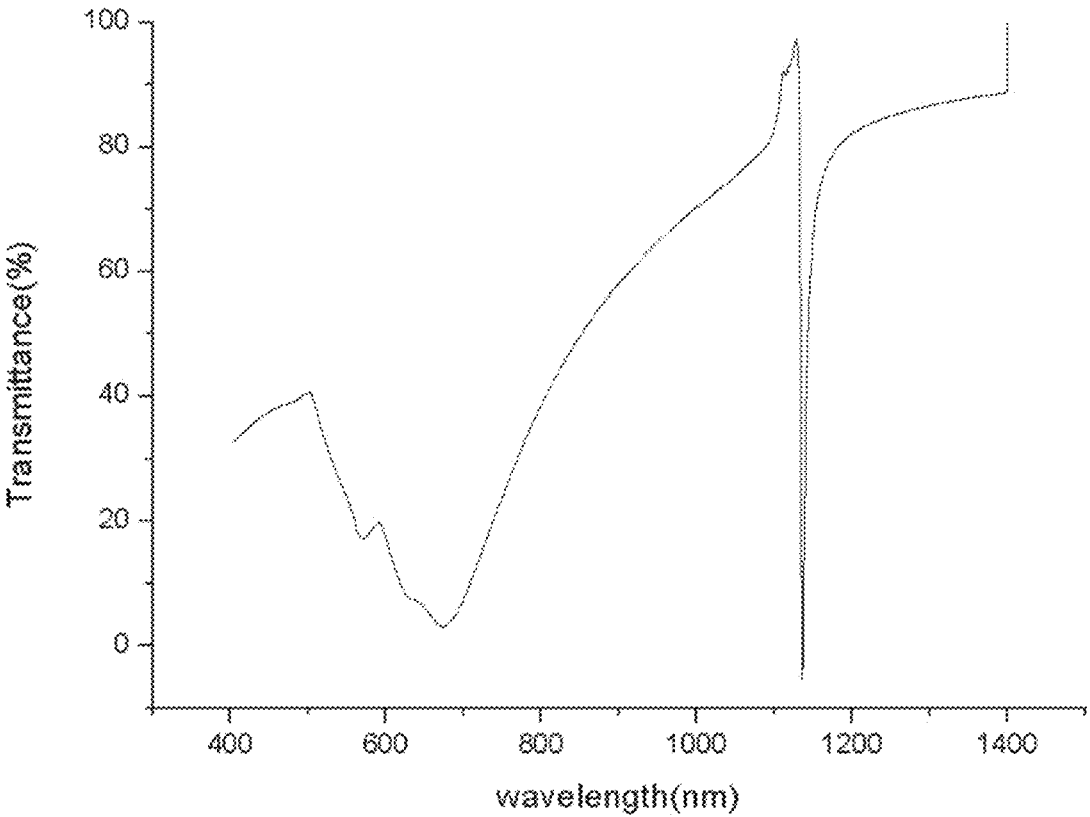
FIG. 4 shows a simulation diagram of the three-dimensionally arranged nanoparticle film with an array structure prepared in Example 1, with parameters including: a wrinkle period of 750 nm, a gold nanosphere diameter of 35 nm, an interval of 5 nm, a wrinkle height of 126 nm, and polarization transmission perpendicular to a wrinkle direction at an ambient refractive index of 1.3.
Figure 5:
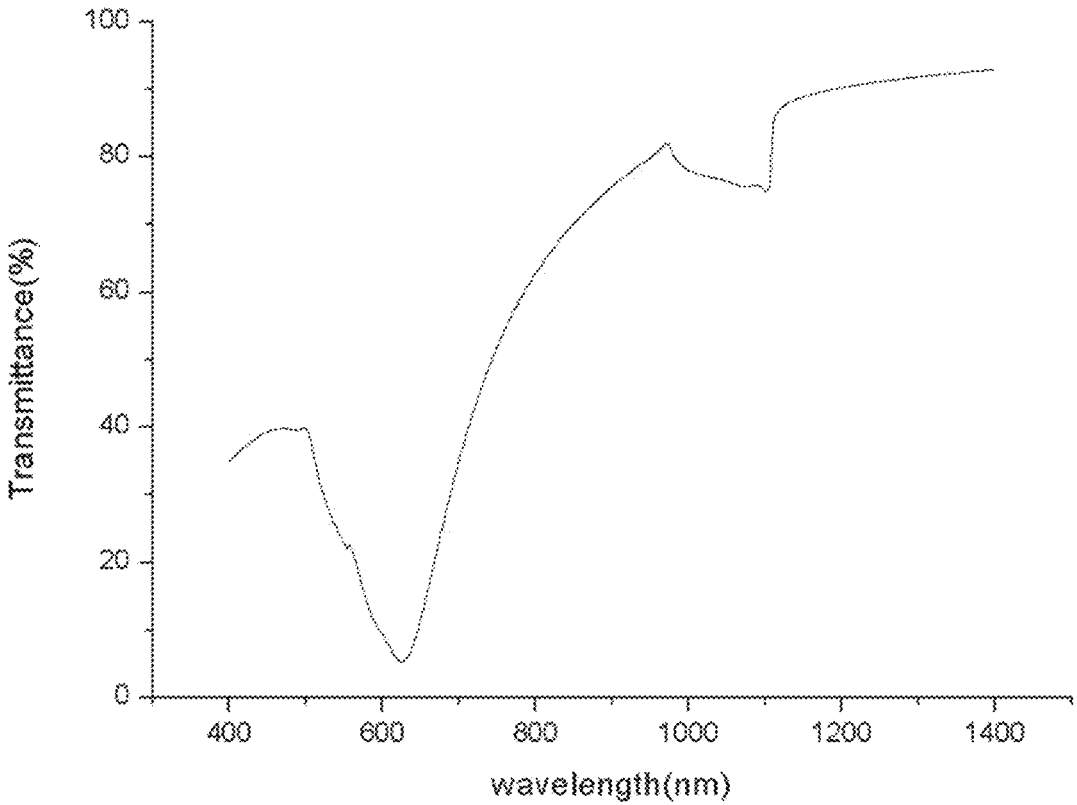
FIG. 5 shows a simulation diagram of the three-dimensionally arranged nanoparticle film with an array structure prepared in Example 1, with parameters including: a wrinkle period of 750 nm, a gold nanosphere diameter of 35 nm, an interval of 5 nm, a wrinkle height of 126 nm, and polarization transmission perpendicular to a wrinkle direction at an ambient refractive index of 1.5.
Figure 6:
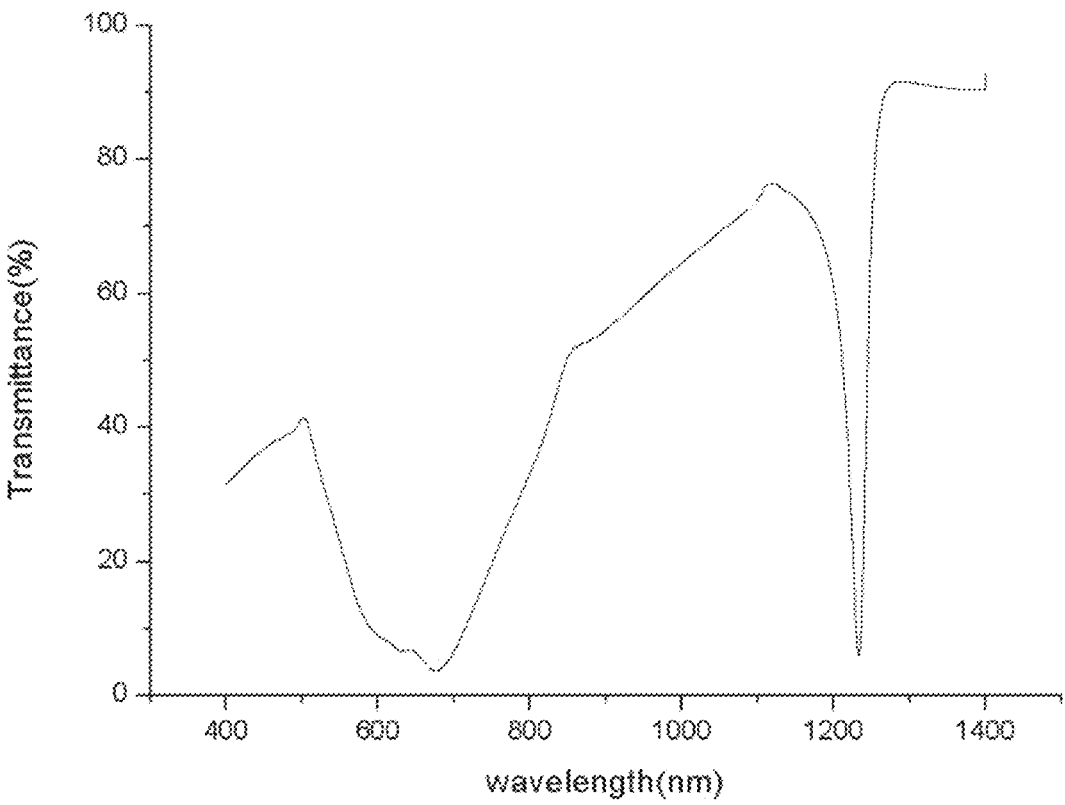
FIG. 6 shows a simulation diagram of the three-dimensionally arranged nanoparticle film with an array structure prepared in Example 1, with parameters including: a wrinkle period of 750 nm, a gold nanosphere diameter of 35 nm, an interval of 5 nm, a wrinkle height of 126 nm, and polarization transmission along a wrinkle direction at an ambient refractive index of 1.3.
Figure 7:
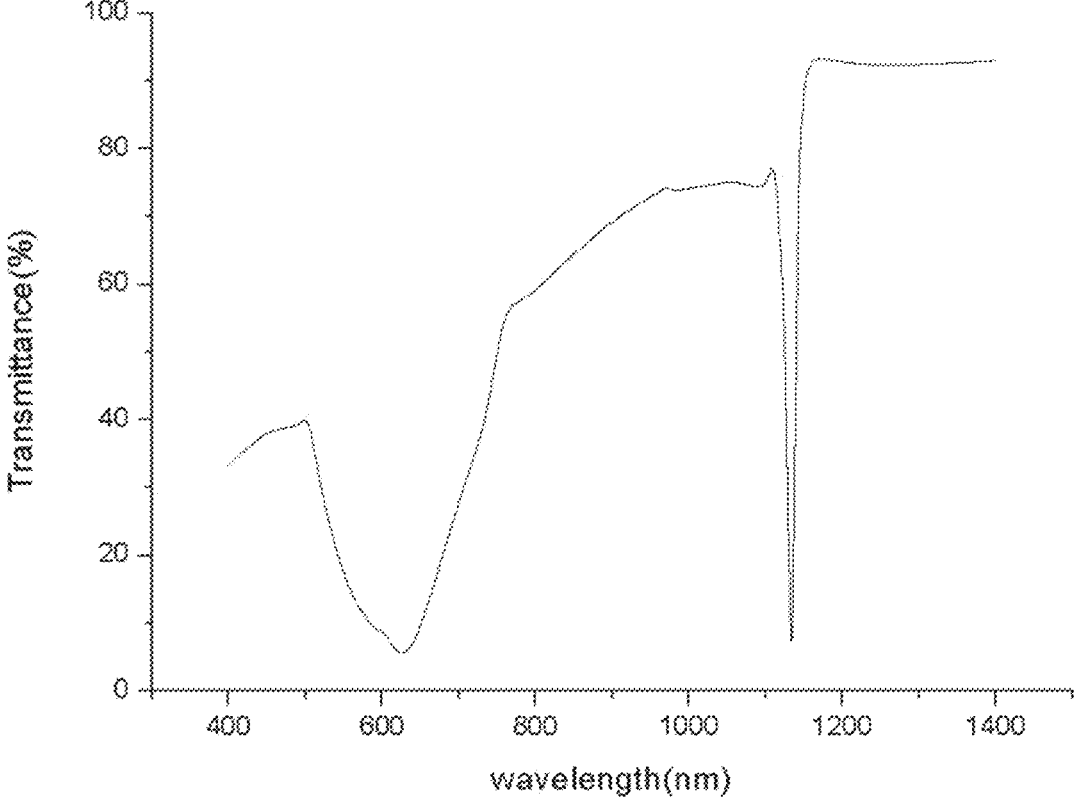
FIG. 7 shows a simulation diagram of the three-dimensionally arranged nanoparticle film with an array structure prepared in Example 1, with parameters including: a wrinkle period of 750 nm, a gold nanosphere diameter of 35 nm, an interval of 5 nm, a wrinkle height of 126 nm, and polarization transmission along a wrinkle direction at an ambient refractive index of 1.5.

FIG. 2 and FIG. 3 showed a schematic diagram and a physical figure of the three-dimensionally arranged nanoparticle film with an array structure prepared in this example, respectively. It was seen from FIG. 2 to FIG. 3 that a three-dimensionally arranged nanoparticle film with an array structure was prepared in the present disclosure.

The simulation results (refractive index in different environments and transmittance in different directions) of the three-dimensionally arranged nanoparticle film with an array structure prepared in this embodiment in different directions were shown in FIG. 4 to FIG. 7. The parameters in FIG. 4 included: a wrinkle period of 750 nm, a gold nanosphere diameter of 35 nm, an interval of 5 nm, a wrinkle height of 126 nm, and polarization transmission perpendicular to a wrinkle direction at an ambient refractive index of 1.3; the parameters in FIG. 5 included: a wrinkle period of 750 nm, a gold nanosphere diameter of 35 nm, an interval of 5 nm, a wrinkle height of 126 nm, and polarization transmission perpendicular to a wrinkle direction at an ambient refractive index of 1.5; the parameters in FIG. 6 included: a wrinkle period of 750 nm, a gold nanosphere diameter of 35 nm, an interval of 5 nm, a wrinkle height of 126 nm, and polarization transmission along a wrinkle direction at an ambient refractive index of 1.3; and the parameters in FIG. 7 included: a wrinkle period of 750 nm, a gold nanosphere diameter of 35 nm, an interval of 5 nm, a wrinkle height of 126 nm, and polarization transmission along a wrinkle direction at an ambient refractive index of 1.5. It was seen from FIG. 4 to FIG. 7 that the three-dimensionally arranged nanoparticle film with an array structure prepared by the present disclosure could excite vertical and parallel multiple-surface lattice resonances, and had excellent optical properties.

Figure 8:
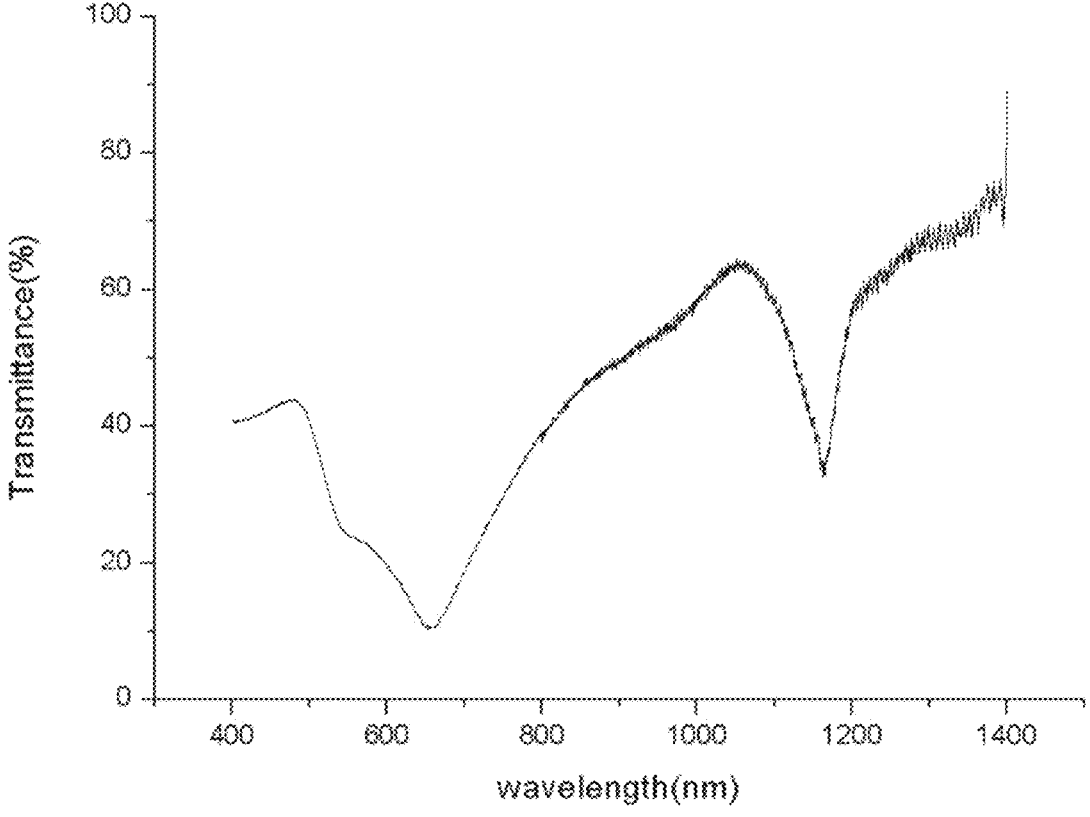
FIG. 8 shows a transmission spectrum of the three-dimensionally arranged nanoparticle film with an array structure prepared in Example 1, with parameters including: a wrinkle period of 750 nm, a gold nanosphere diameter of 35 nm, an interval of 5 nm, a wrinkle height of 126 nm, and polarization transmission perpendicular to a wrinkle direction at an ambient refractive index of 1.3.
Figure 9:
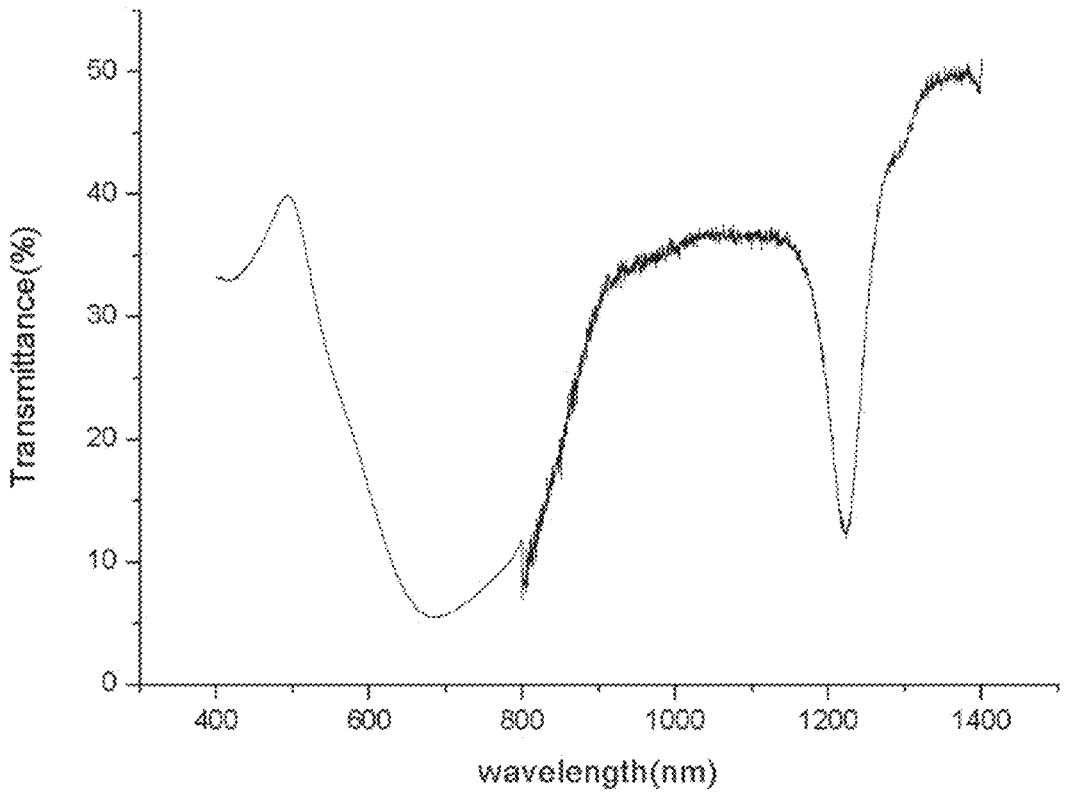
FIG. 9 shows a transmission spectrum of the three-dimensionally arranged nanoparticle film with an array structure prepared in Example 1, with parameters including: a wrinkle period of 750 nm, a gold nanosphere diameter of 35 nm, an interval of 5 nm, a wrinkle height of 126 nm, and polarization transmission along a wrinkle direction at an ambient refractive index of 1.3.

FIG. 8 showed a transmission spectrum of the three-dimensionally arranged nanoparticle film with an array structure prepared in this example, with parameters including: a wrinkle period of 750 nm, a gold nanosphere diameter of 35 nm, an interval of 5 nm, a wrinkle height of 126 nm, and polarization transmission perpendicular to a wrinkle direction at an ambient refractive index of 1.3.

Example 2

A three-dimensionally arranged nanoparticle film with an array structure was prepared according to the method in Example 1. The difference between this example and Example 1 was that the three-dimensional template was a polystyrene wrinkled template;

A preparation method of the polystyrene wrinkled template included: a PS nanosphere aqueous suspension with a particle size of 800 μm and a concentration of 2.5% w.t was subjected to ultrasonic treatment for 10 min, and the PS nanosphere aqueous suspension was mixed with ethanol at a volume ratio of 1:1 to obtain a PS nanosphere mixture; a substrate was placed on a bottom of a petri dish filled with deionized water, and the PS nanosphere mixture was slowly injected into a surface of the deionized water in the petri dish with a syringe pump at 8 μL/min, such that PS nanospheres spread on an air/water interface; the deionized water was removed by extraction using a syringe pump, and a PS nanosphere monolayer film slowly fell on a surface of the substrate to obtain the polystyrene wrinkled template.

Figure 10:
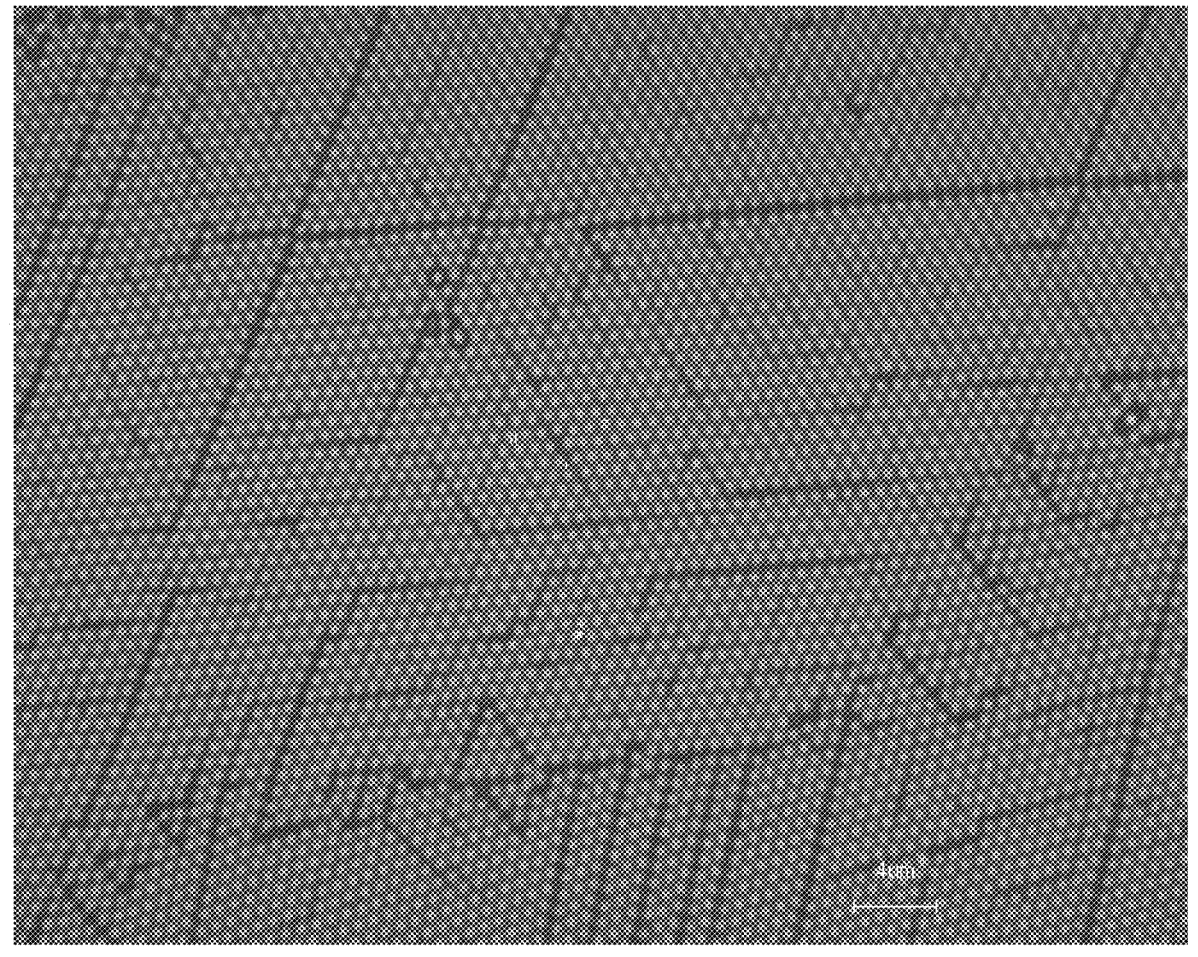
FIG. 10 shows an optical microscope reflection map of a PS wrinkled array template prepared in Example 2.

FIG. 10 showed a real picture of the polystyrene wrinkled template prepared in this example. It was seen from FIG. 10 that a neatly-structured polystyrene wrinkled template was prepared in the present disclosure.

The above description of examples is merely provided to help understand the method of the present disclosure and a core idea thereof. It should be noted that, several improvements and modifications may be made by a person of ordinary skill in the art without departing from the principle of the present disclosure, and these improvements and modifications should also fall within the protection scope of the present disclosure. Various amendments to these examples are apparent to those of professional skill in the art, and the general principles defined herein may be implemented in other examples without departing from the spirit or scope of the present disclosure. Thus, the present disclosure is not limited to the examples shown herein but falls within the widest scope consistent with the principles and novel features disclosed herein.

What is claimed is:

1. A preparation method of a three-dimensionally arranged nanoparticle film with an array structure, comprising the following steps:

(1) coating a nanoparticles with a hydrophobic molecules, and dispersing in an organic solvent to obtain a modified nanoparticle dispersion;

(2) conducting a surface treatment on a three-dimensional template to obtain a hydrophilic three-dimensional template; and (3) adding water to a surface of the hydrophilic three-dimensional template to form a water film, adding the modified nanoparticle dispersion dropwise on a surface of the water film to conduct self-assembly, and removing the water film to obtain a three-dimensionally arranged nanoparticle film that is arranged along the three-dimensional template; wherein steps (1) and (2) are conducted in any order;

the three-dimensional template is selected from the group consisting of a polydimethylsiloxane wrinkled template, a polystyrene wrinkled template, and a physically etched template; and the three-dimensional template has an array period greater than or equal to a particle size of the nanoparticle.

2. The preparation method according to claim 1, wherein the nanoparticle is selected from the group consisting of a metal nanoparticle and a solid dielectric nanoparticle;

the nanoparticle has a particle size of 10 nm to 500 nm; and the nanoparticle is in a shape of a sphere, a cube, a disk, a rod, a cone, or an arrowhead.

3. The preparation method according to claim 1, wherein the modified nanoparticle dispersion has a concentration of 5 mg/mL to 300 mg/mL;

the modified nanoparticle dispersion is added dropwise on the surface of the water film at a volume of 0.1 μL to 1,000 μL; and the water film has a thickness of 0.1 mm to 100 mm and a radius of 0.1 cm to 100 cm.

4. The preparation method according to claim 2, wherein the metal nanoparticle is a noble metal nanoparticle.

5. The preparation method according to claim 2, wherein the solid dielectric nanoparticle comprises a lithium niobate nanoparticle.

6. The preparation method according to claim 1, wherein the hydrophobic molecule is one or more selected from the group consisting of polystyrene, polyvinylpyrrolidone, polytetrafluoroethylene, polydimethylsiloxane, polyvinylidene fluoride, polypropylene, polyethylene, polymethyl methacrylate, polyolefin, polyamide, polyacrylonitrile, polycarbonate, fluorosilicone resin, molten paraffin, and silicone wax emulsion.

7. The preparation method according to claim 1, wherein the hydrophobic molecule has a number-average molecular weight of 1,000 to 50,000.

8. The preparation method according to claim 1, wherein the hydrophobic molecule and the nanoparticle are at a mass ratio of 1:(1-3).

9. The preparation method according to claim 1, wherein the organic solvent is selected from the group consisting of chloroform, toluene, and tetrahydrofuran.

10. The preparation method according to claim 1, wherein the surface treatment comprises one or more of plasma cleaning, piranha solution cleaning, and Radio Corporation of America (RCA) standard cleaning.

11. The preparation method according to claim 10, wherein the surface treatment is to subject a middle region of the three-dimensional template to a hydrophilic treatment, while other regions are not subjected to the surface treatment; and the middle region has an area accounting for 60% to 65% that of the three-dimensional template.

12. The preparation method according to claim 1, wherein the polydimethylsiloxane wrinkled template is prepared by a process comprising the following steps:

(1) mixing a polydimethylsiloxane (PDMS) prepolymer with a curing agent, and conducting curing to obtain a PDMS sheet;

(2) stretching the PDMS sheet, and conducting cleaning, an oxygen treatment, and release recovery in sequence to obtain orderly-arranged wrinkles; and (3) conducting cleaning, the oxygen treatment, a piranha solution treatment, and water washing on the orderly-arranged wrinkles to obtain the PDMS wrinkled template.

13. The preparation method according to claim 12, wherein in step (1), the PDMS prepolymer and the curing agent are at a mass ratio of (7-15):1.

14. The preparation method according to claim 12, wherein in step (2), the stretching is conducted at a stretching rate of 10% to 35%;

the oxygen treatment is conducted at an oxygen concentration of 0.1 mbar to 0.3 mbar for 10 sec to 30 sec; and the release recovery is conducted at 900 μm/min to 1,100 μm/min.

15. The preparation method according to claim 12, wherein in step (3), the oxygen treatment is conducted at an oxygen concentration of 0.1 mbar to 0.3 mbar for 10 sec to 20 sec.

16. The preparation method according to claim 1, wherein the polystyrene wrinkled template is prepared by a process comprising the following steps:

conducting an ultrasonic treatment on a polystyrene (PS) nanosphere aqueous suspension, and mixing with ethanol to obtain a PS nanosphere mixture; and placing a substrate in deionized water, injecting the PS nanosphere mixture into a surface of the deionized water, spreading PS nanospheres on an air/water interface to form a PS nanosphere monolayer film, and removing the deionized water by extraction, such that the PS nanosphere monolayer film falls on the substrate to obtain the polystyrene wrinkled template.

17. The preparation method according to claim 16, wherein the PS nanosphere has a particle size of 500 nm to 5 μm;

the ultrasonic treatment is conducted at 50 W to 300 W for 10 min to 15 min; and the injecting is conducted at 0.1 μL/min to 0.5 μL/min.

18. The preparation method according to claim 17, wherein when the PS nanosphere has a particle size of 0.5 μm to 2 μm, the PS nanosphere aqueous suspension and the ethanol are at a volume ratio of 1:(0.6-1); and when the PS nanosphere has a particle size of 2 μm to 5 μm, the PS nanosphere aqueous suspension and the ethanol are at a volume ratio of 1:(0.4-0.6).

19. A preparation method of a three-dimensionally arranged nanoparticle film with an array structure, comprising the following steps:

(1) coating a nanoparticle with a hydrophobic molecule, and dispersing in an organic solvent to obtain a modified nanoparticle dispersion;

(2) conducting a surface treatment on a three-dimensional template to obtain a hydrophilic three-dimensional template; and (3) adding water to a surface of the hydrophilic three-dimensional template to form a water film, adding the modified nanoparticle dispersion dropwise on a surface of the water film to conduct self-assembly, and removing the water film to obtain a three-dimensionally arranged nanoparticle film that is arranged along the three-dimensional template; wherein steps (1) and (2) are conducted in any order; and the surface treatment is to subject a middle region of the three-dimensional template to a hydrophilic treatment, while other regions are not subjected to the surface treatment; and the middle region has an area accounting for 60% to 65% that of the three-dimensional template.

\*   \*   \*   \*   \*